Nov. 6, 1923.    W. R. SCOTT    1,473,446
MEANS FOR EXPANDING PISTON RINGS
Filed June 6, 1922

Inventor
Walter R. Scott.
by his Attorneys.
Howson & Howson

Patented Nov. 6, 1923.

1,473,446

UNITED STATES PATENT OFFICE.

WALTER R. SCOTT, OF PHILADELPHIA, PENNSYLVANIA.

MEANS FOR EXPANDING PISTON RINGS.

Application filed June 6, 1922. Serial No. 566,360.

*To all whom it may concern:*

Be it known that I, WALTER R. SCOTT, a citizen of the United States, residing in Philadelphia, Pennsylvania, have invented certain Improvements in Means for Expanding Piston Rings, of which the following is a specification.

One object of my invention is to locate a spring ring between the base of the groove in a piston and the split piston ring so as to force the piston ring yieldingly against the wall of a cylinder.

A further object of the invention is to design the coiled spring ring so that it will readily accommodate itself to the movement of the piston ring in the cylinder.

The invention relates particularly to explosive engine pistons, which are comparatively small and in which the rings must be gas tight in order to obtain the full power of the explosion of the gases, but must yield sufficiently to allow the pistons to move freely in the cylinders.

Figure 1:
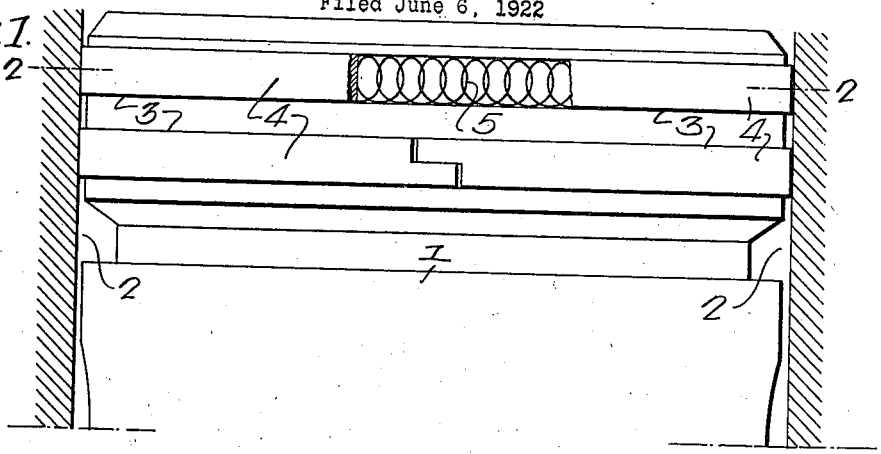
Fig. 1 is a side view of the piston of an internal combustion engine, showing one of the piston rings in section.

Referring to the drawings, 1 is the piston of a gas engine in the present instance. 2 is the cylinder. The piston is grooved at 3 and located in the grooves are the metallic split rings 4 of the usual type. In the present instance, there are two grooves and a single piston ring in each groove. In each groove, back of the piston ring, is a coiled spring ring 5, which has sufficient pressure to expand the piston rings and to hold them yieldingly against the wall of the cylinder so as to make a fluid tight joint between the piston and the cylinder. The rings also center the piston in the cylinder.

Figure 2:
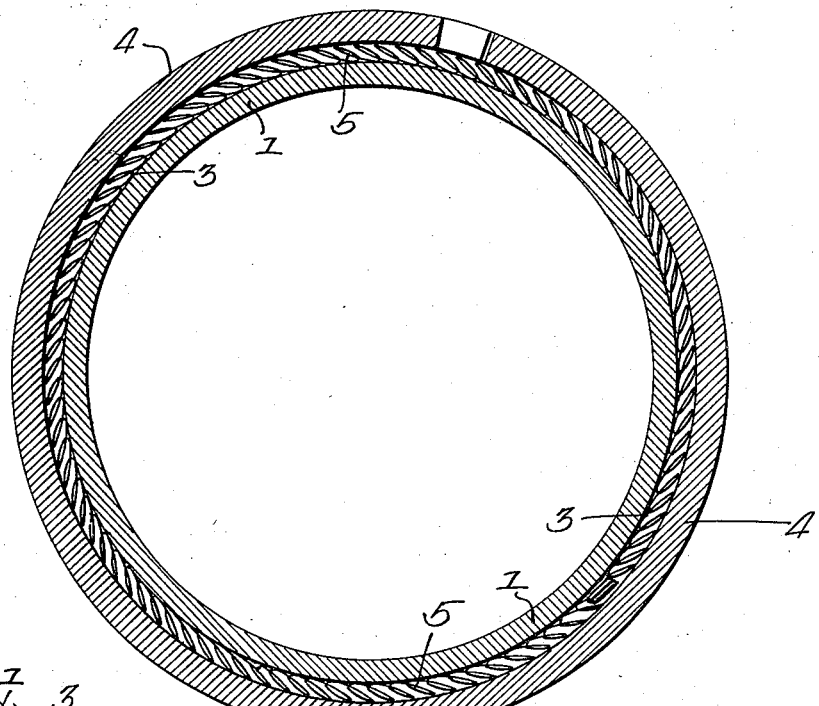
Fig. 2 is a sectional plan view on the line 2—2, Fig. 1.
Figure 3:
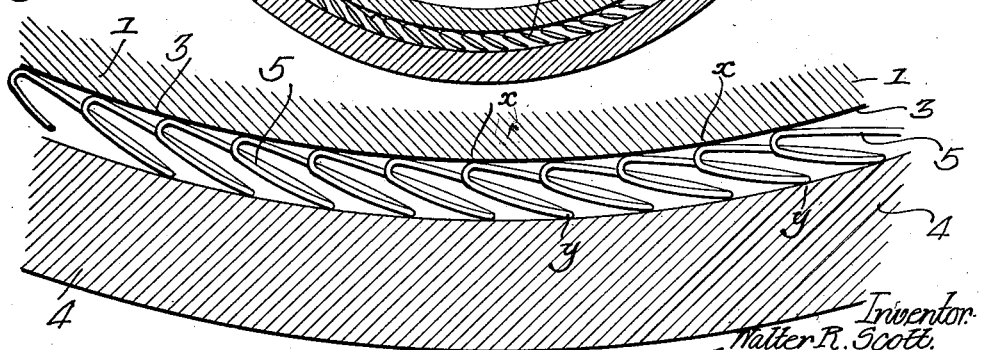
Fig. 3 is an enlarged sectional view illustrating a portion of the piston and showing the piston ring bearing against the wall of a cylinder.

The convolutions of the spring ring are made in a particular manner so that one convolution will overlap another, as shown clearly in Figs. 2 and 3. The convolutions are on tangential lines drawn from points some distance from the center of the piston. The fulcrum of each convolution of the spring is at $x$ at the inner wall of the groove and the bearing of each convolution against the ring is at $y$, Fig. 3. This construction allows each convolution to yield readily, and each convolution acts as an independent spring. The two ends of the coiled wire, which form the ring, may be connected in any suitable manner so as to make a complete ring.

It will be noticed that the ring is slightly flattened. This is due to the fact that one convolution overlaps another. When the rings are made in the usual manner, the convolutions are so rigid that they will not force the piston rings yieldingly against the walls of a cylinder.

From practical experiments, it has been found that a ring made in accordance with my invention will hold the piston ring yieldingly against the walls of a cylinder, yet the pressure will be so slight that it will not affect the movement of the piston.

While my invention is especially adapted for use in holding the rings of a piston yieldingly against the wall of a cylinder, it may be used for yieldingly holding other rings without departing from the essential features of the invention.

I claim:

1. The combination of a piston having a groove therein; a split metallic piston ring mounted in the groove; and a coiled spring ring mounted in the groove back of the piston ring, the convolutions of the spring ring being so arranged that one convolution overlaps an adjoining convolution, which allows each convolution to act as an independent spring having a fulcrum point and a bearing point.

2. A ring for use in forcing a piston ring mounted in a piston against the wall of a cylinder, said ring consisting of an endless spring wire coiled to form a series of convolutions, the convolutions being arranged so that one convolution overlaps another, each convolution having a fulcrum point and a bearing point, whereby the same may function as independent springs yieldingly holding a piston ring against the wall of a cylinder.

3. The combination of a piston having a groove therein; a split metallic ring mounted in the groove, and a spring member located in the groove and encircling the piston, the spring member having a series of spring elements whose fulcrums are at one side of the point of contact with the ring so as to yieldingly force the ring against the walls of a cylinder.

4. A spring consisting of a coiled wire, the convolutions of the spring being so arranged that one convolution overlaps another in such manner that each convolution becomes a spring member adapted to yield about a fulcrum point under a pressure transverse to the plane of the respective convolution.

5. In combination, a pair of relatively movable members, one of said members having a groove therein, a third member movably positioned in said groove, and means disposed in said groove intermediate said third member and said grooved member for causing said third member to yieldingly engage the remaining member, the said means comprising a helical spring, the convolutions of which are so arranged that one overlaps another, each convolution constituting a spring member having a fulcrum point and a bearing point such as to exert a resilient force transverse to the plane of the respective convolutions.

WALTER R. SCOTT.